Jan. 6, 1953  G. F. LAING  2,624,524
FISHING REEL
Original Filed Feb. 4, 1946  2 SHEETS—SHEET 1
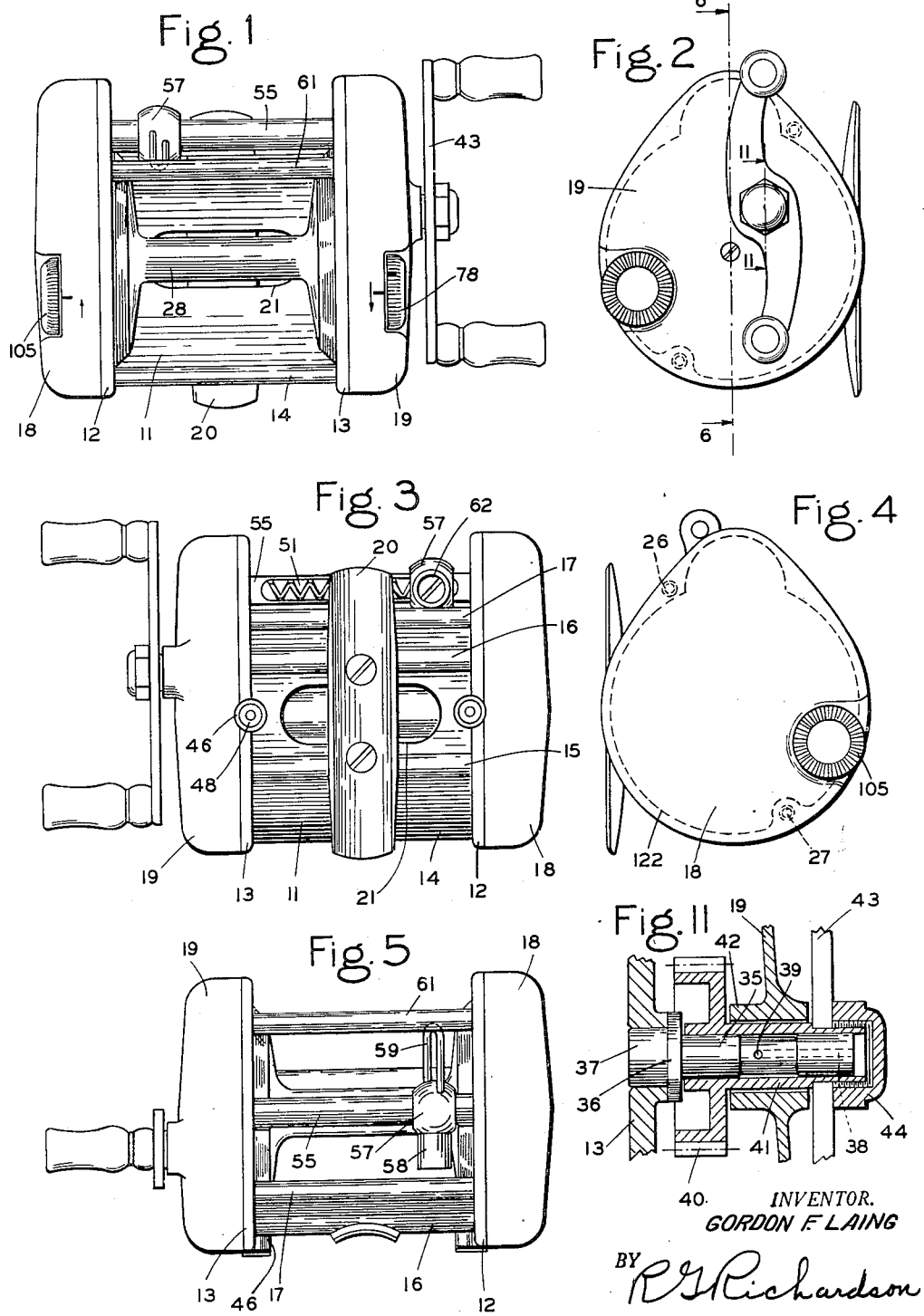
INVENTOR.
GORDON F LAING
BY R G Richardson
ATTY Jan. 6, 1953                  G. F. LAING                 2,624,524
FISHING REEL
Original Filed Feb. 4, 1946                            2 SHEETS—SHEET 2
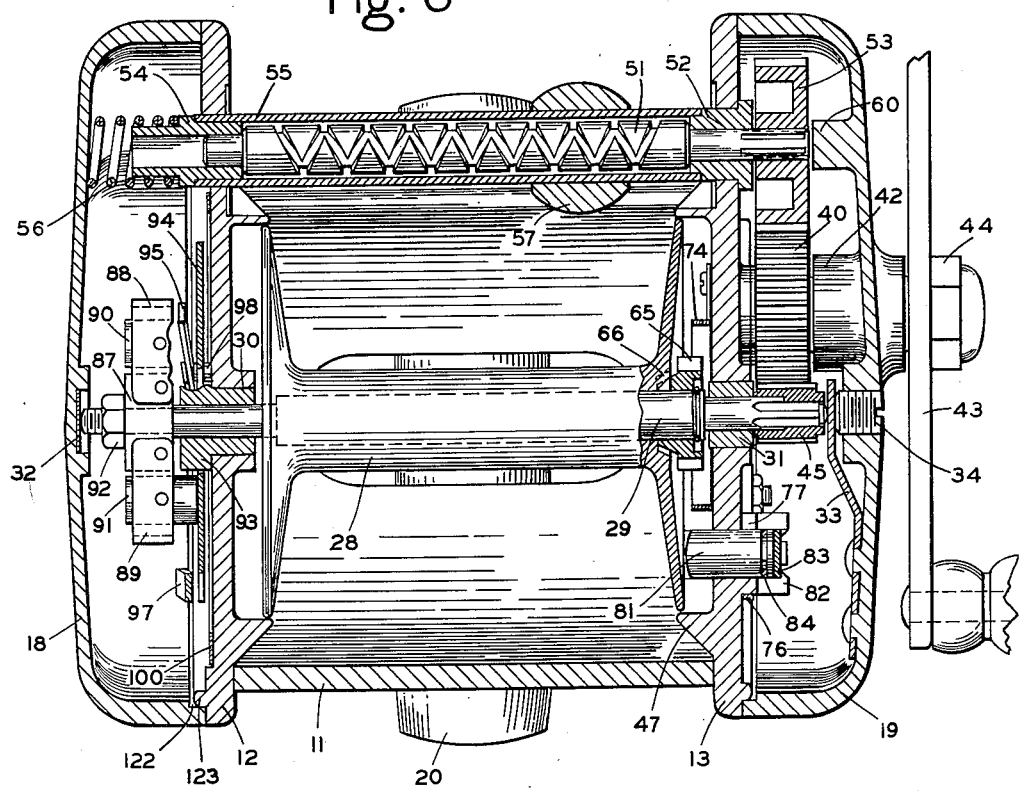
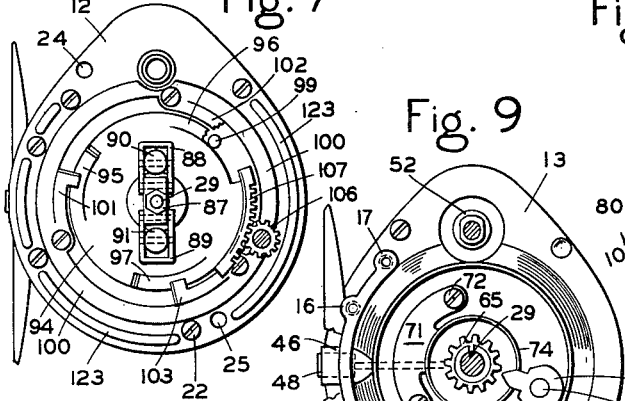
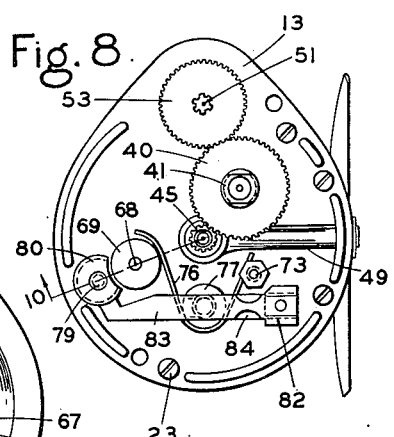
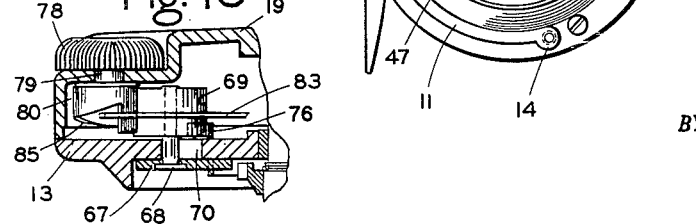
INVENTOR.
GORDON F. LAING
BY R. G. Richardson
ATTY Patented Jan. 6, 1953

2,624,524

UNITED STATES PATENT OFFICE 2,624,524

FISHING REEL

Gordon F. Laing, Delavan, Wis., assignor to The George W. Borg Corporation, Chicago, Ill., a corporation of Delaware Original application February 4, 1946, Serial No. 645,334, now Patent No. 2,572,496, dated October 23, 1951. Divided and this application June 24, 1950, Serial No. 170,139

1 Claim. (Cl. 242—84.6)

The present invention relates in general to fishing reels and the object of the invention is to produce a new and improved device of this character. This application is a division of application Serial No. 645,334, filed February 4, 1946, now Patent No. 2,572,496, granted October 23, 1951.

A feature of the invention claimed in the instant application is a new and improved click and brake mechanism having a common control and adjusting device.

Other features of the invention are claimed in another divisional application Ser. No. 68,979, filed January 3, 1949.

The foregoing and other features will be described fully in the following specification, reference being had to the accompanying drawings, in which—

Fig. 1 is a top view of a fishing reel embodying the invention;

Fig. 2 is an end view of the same, as seen from the right in Fig. 1;

Fig. 3 is a bottom view of the fishing reel;

Fig. 4 is another view, as seen from the right in Fig. 3;

Fig. 5 is a front view of the fishing reel;

Fig. 6 is a cross section through the reel, taken on the line 6—6 in Fig. 2;

Fig. 7 is an end view corresponding to Fig. 4, with the end cap removed;

Fig. 8 is an end view corresponding to Fig. 2, with the other end cap removed;

Fig. 9 is another end view, from the same direction as Fig. 7, with various parts removed so as to expose the opposite side of the frame plate shown in Fig. 8;

Fig. 10 is a partial cross section on the line 10, Fig. 8; and

Fig. 11 is a partial cross section on the line 11—11, Fig. 2.

Referring to the drawings, the frame of the reel comprises a semi-cylindrical frame member 11, and two end plates 12 and 13, the shape of which can be seen in Figs. 7, 8, and 9. These parts may be aluminum die castings. The frame member 11 has four ribs 14, 15, 16, and 17, which can be seen in Figs. 1, 3, and 5 and also in the end view, Fig. 9. The end plate 12, see Fig. 7, is attached to the frame member 11 by means of four screws such as 22 which pass through the end plate and are threaded into tapped holes in the frame member. These holes are located at the ribs 14—17, as can be seen in Fig. 9. The end plate 13, Fig. 8, is attached to the frame member 11 in the same way, by screws such as 23.

In order to mount the reel on a fishing rod the usual curved plate or saddle 20 is provided and is attached to the frame member 11 by means of screws, as shown in Fig. 3.

It will be seen that the reel frame, including the frame member 11, is exceptionally strong and rigid, considerably more so than the usual frame in which the frame plates are secured together by separate pillars. This frame member 11 also functions as a splash guard to prevent the rotating spool, when casting with a wet line, from throwing water onto the hand of the fisherman. An opening 21 is provided in the frame member which reduces the weight of the reel somewhat and drains out water which might otherwise accumulate.

The end caps 18 and 19 may also be aluminum die castings and enclose the parts at the ends of the reel outside the frame plates. These end caps are secured to the frame plates by screws. The end cap 18, for example, has an internal annular recess 122, shown in Fig. 6 and indicated by a dotted line in Fig. 4, which is machined to fit the outside of the annular rib 123 with which the frame plate 12 is provided. The end cap is held against the frame plate by two screws which pass through the holes 24 and 25 in the frame plate, Fig. 7, and are threaded into tapped holes 26 and 27 in the end cap. These holes are indicated by dotted circles in Fig. 4. The end cap 19 is generally similar to end cap 18 and is secured to the frame plate 13 in the same manner.

The reel spool is indicated by reference character 28 and is carried on the shaft 29. The shaft has bearings in the bronze bearing bushings 30 and 31 which are supported on the end plates 12 and 13, respectively, as shown in Fig. 6. The shaft has a thrust bearing at the steel disc 32 carried on the end cap 18 and another thrust bearing at the spring 33 which is carried on the end cap 19 and is tensioned against the adjusted screw 34. This screw is threaded into a tapped hole in the end cap 19 and is used to adjust the end play in the shaft.

The reel spool 28 is rotated by means of the double ended crank 43 which turns the spur gear 40 meshing with the pinion 45 on the spool shaft 29. The pinion 45 has internal grooves to fit the splined end of the shaft, which prevents the pinion from rotating relative to the shaft. The pinion is removable and is normally held in place on the shaft by the spring 33 on the end cap 19.

The construction of gear 40 and associated parts can best be explained in connection with Fig. 11. The gear has an integrally formed tubular shaft 41, whereby it is rotatably supported on the stud or post 35. The post 35 has an annular flange 36 which bears against a boss on the frame plate 13 and an end extension 37 which is received in an opening in the frame plate 13. The extension 37 may have a press fit in the frame plate and may be further secured by riveting or staking. The post 35 and shaft 41 pass through an opening in the end cap 19, which is large enough to afford clearance for the shaft. A boss 42 surrounds this opening and projects inwardly toward the gear wheel 40. The gear wheel has a small amount of end play between the flange 36 and the boss 42. Near the right end the shaft 35 is threaded and is cut away on opposite sides to form shoulders against which the crank 43 is clamped in the usual manner by the nut 44.

To provide for oiling the bearing between shaft 41 and post 35, the latter has a longitudinal hole 35 which is connected with a wide annular channel on the post by means of the cross hole 39. If desired a wick may be threaded through the holes 38 and 39 to convey oil to the channel from the space inside the nut 44.

At this time the arrangement for oiling the bearings of shaft 29 may also be explained. The frame plate 13 has a short radial rib 46, Fig. 9, which extends from the flange 47 to the outer edge of the frame plate and is drilled out to receive the oil cup 48. There is a correspondingly located but longer radial rib 49 on the other side of the frame plate which extends inwardly to the boss which surrounds the bearing bushing 31 and which is drilled to provide an oil channel extending from the oil cup to the bearing. This hole of course extends through the wall of the bearing bushing. The arrangement of oil cup and oil channel for oiling the bearing 30 at the other end of the shaft is the same.

The level wind mechanism is generally similar to level wind mechanisms used in previous reels. The level wind shaft is indicated at 51 and at one end has a bearing in the bearing bushing 52 which is fixed in the frame plate 13. At the other end the shaft has a bearing in the flanged sleeve 54. This sleeve fits inside the housing tube 55 which in turn has a close fit in a hole drilled in the frame plate 12. At the other end the tube 55 is supported on the bearing bushing 52. The sleeve 54, tube 55 and shaft 51 are removable and are normally held in assembled position by a spring 56 which is compressed between the flange on sleeve 54 and the end cap 18. The tube 55 should be formed to fit the partly squared end of the bushing 52 to insure its proper orientation when assembled.

The shaft 51 is driven by a gear 53 which is mounted on the splined end of the shaft and is in mesh with the gear 40. The gear 53 is retained on the shaft by a boss 60 on the end cap 19.

The line guide 59 and the line guide carriage 57 are shown clearly in Figs. 3 and 5. The carriage 57 is slidable on the tube 55. Movement of the carriage responsive to rotation of shaft 51 is brought about in known manner by means of a pawl which is carried in the housing 58, where it is retained by a screw 62, and which has access to the grooved shaft 51 through a slot in the tube 55. The end of the line guide 59 rides in a slot in the pillar 61 which is supported on the frame plates 12 and 13.

The click mechanism may now be described.

The click gear is indicated by the reference numeral 65 and is mounted on the spool shaft 29 between the spool and the frame plate 13, as shown in Fig. 6. The shaft is grooved for a retaining ring which holds the click gear on the shaft. The spool is recessed to receive the tapered hub of the gear and includes an integrally formed projection 66 which extends into the recess and into a notch in the hub of the gear to prevent the gear from turning on the shaft.

The click pawl 67 is rotatably supported on a headed and shouldered stud 68, Figs. 9 and 10, which extends through the slot 70 in the frame plate 13 and is rigidly secured to the short cylindrical member 69. The click spring includes a base portion 71, which is fastened to the frame plate 13 by screws 72 and 73, and two semi-circular leaves 74 and 75 which engage the click pawl 67 on opposite sides thereof. The pawl assembly is normally maintained in the position in which it is shown in Figs. 9 and 10, with the pawl out of engagement with the click gear, by a spring 76 which is tensioned between the member 69 and the screw 73. The screw 73 is one of the screws which fasten the click spring 71 to the frame plate and extends through the frame plate to cooperate with the spring 76 as described. A boss 77 formed on frame plate 13 and a nut on screw 73 serve to retain spring 76 in position.

The click pawl 67 may be moved into operative relation to the click gear 65 by means of the cam 80, operated by the knurled knob 78. This knob is located in a recess in the end cap 19 and is rigidly mounted on a short shaft 79 which extends through the end cap. The cam 80 rests against a shoulder on the shaft where it is secured by riveting the end of the shaft. A friction washer is preferably interposed between the cam 80 and the end cap to prevent accidental turning of the knob 78. The cam 80 has an arcuate recess, as shown in Fig. 8, in which the cylindrical member 69 of the click pawl assembly is normally received. When the cam 80 is rotated by means of the knob 78 the member 69 rides up out of this recess on to the cylindrical part of the cam and the click pawl assembly necessarily moves radially toward the click gear 65 against the tension of spring 76. In this operation the stud 68 on which the click pawl 67 is supported moves along the slot 70 and the pawl is brought into engagement with the gear. When the knob is rotated back and the recess in the cam is again brought into alignment with the member 69 the click pawl assembly is restored by the spring 76.

The brake mechanism includes a cylindrical brake member 81 which may be made of Bakelite and is slidable in a hole drilled through the frame plate 13 at the boss 77. The block 82, which may be formed integrally with the frame plate, serves to support the relatively stiff spring 83 and a lighter spring 84. Spring 83 extends from the block 82 to the cam 80, as shown in Fig. 8, but the spring 83 extends only to the brake member 81 where the end of the spring is forked to receive the grooved end of the brake member. Spring 84 is tensioned toward spring 83 and is effective to normally maintain the brake member 81 in the position in which it is shown in Fig. 6, where it is out of contact with the spool 28.

The brake is put on and adjusted by means of the knob 78, which also controls the click. To this end the cam 80 is provided with a cam surface 85 in the form of an inclined plane which cooperates with the end of spring 83. When the knob 78 is rotated from its normal or "off" position it first puts on the click, that is, the click pawl 67 is moved into operative relation to the click gear in the manner already described. This initial rotation of the knob does not put on the brake but is effective to bring the cam surface 85 into engagement with the end of spring 83 and to depress the spring sufficiently to start the movement of the brake member 81 toward the head of spool 28. Further rotation of the knob causes the brake member 81 to engage the spool head with a pressure which depends upon the tension in spring 83 which in turn depends upon the extent of such further rotation. It will be noted that spring 83 is narrower in width near the block 82, due to two arcuate cut-outs, so that it bends mainly at this point.

The brake is released by rotation of the knob 78 in the opposite direction, as will be understood. The brake may be released while the click is left on by rotating the knob 78 only far enough to relieve the tension in spring 83. For convenience an index line may be provided on the knob 78 for cooperation with a similar line or mark on the end cap 19, as shown in Fig. 1, these lines being so located that when they are in alignment the click is on but the brake is off. Suitable calibrations may also be employed to indicate different degrees of brake pressure, if desired, but will not usually be required.

The antibacklash mechanism may now be described, reference being had to Figs. 6 and 7.

The shaft 29 has a threaded portion of reduced diameter at the left hand end, forming a shoulder against which the rectangular metal block 87 is tightly screwed. A lock nut 92 is effective to prevent the block 87 from becoming loose on the shaft. Two U-shaped members 88 and 89 are pivotally supported on the block 87 and carry the pivoted brake members 90 and 91. These brake members may be made of Bakelite rod or other suitable material.

The brake members 90 and 91 are adapted to cooperate with a metal disc 94 which is supported in part on the extension 93 of the shaft bearing bushing 30. The disc 94 is rotatable and is also axially movable on the extension 93. The disc 94 is further supported on three pins which project from the frame plate 12 and cooperate with three integrally formed inclined tongues 95, 96, and 97 with which the disc 94 is provided. The pin 98 which cooperates with the tongue 95 can be seen in Fig. 6. In Fig. 7 the tongue 96 has been cut away to expose the pin 99. The remaining pin is underneath the tongue 97, as will be readily understood. The reference character 100 indicates an annular ring made of suitable resilient material which is secured to the frame plate 12 by means of screws and which has three integrally formed spring leaves 101, 102 and 103. These spring leaves are tensioned downward against the tongues 95, 96 and 97, respectively, and serves to hold the tongues in contact with the ends of the pins such as 98 and 99.

The arrangement for adjusting the antibacklash mechanism comprises a knurled knob 105, Fig. 1, a pinion 106 and an arcuate rack 107 which is part of the disc 94. The parts last mentioned are shown in Fig. 7. The construction as regards the knob 105 and pinion 106 is similar to what is shown in Fig. 10 in connection with the knob 78 and cam 80; that is, the knob 105 has a shaft extending through the end cap 18 and the pinion 106 is secured to this shaft inside the end cap.

When the knob 105 is rotated in the direction of the arrow, Fig. 1, it rotates the disc 94 in a clockwise direction as seen in Fig. 7, by means of pinion 106 and rack 107, with the result that the disc moves axially outward in the direction of the brake members 90 and 91. When the knob is rotated in the opposite direction the disc rotates in a counterclockwise direction and moves axially inward toward the frame plate. The axial movement of the disc responsive to rotation thereof is due to the cooperation between the inclined tongues such as 95 on the disc and the fixed pins such as 98 on the frame plate, as will readily be appreciated. At the end of its inward movement the disc 94 rests against the frame plate. This position of the disc, in which the antibacklash mechanism is "off," may be indicated by the alignment of index marks on the knob 105 and the end cap 18, similar to the index marks provided in connection with the knob 78. In Figs. 6 and 7 the position in which the parts are shown is about half way between the "off" position and the fully advanced position, and this "partly on" position is revealed by the position of the index marks in Fig. 1, which are out of alignment.

The operation of the reel will be, for the most part, entirely obvious from the description of the construction which has been given in the foregoing and will not require any explanation. This applies to the operation of reeling in the line, in which the spool 28 is rotated by the crank 43, the concurrent operation of the level wind mechanism, which distributes the coils evenly on the spool, and the operation of the click and brake mechanism. The function of the last mentioned mechanism is well known, and the special features involved in its construction and adjustment have already been explained.

The operation of casting, however, involves the operation of the antibacklash mechanism as to which some further explanation may be desirable. This mechanism is of course designed to prevent overrunning of the spool during casting, which is the cause of backlash.

When a cast is made the bait is projected with an initial high velocity, which has a maximum value very shortly after the bait begins its flight and which decreases quite rapidly, due mainly to the wind resistance. The reel spool is rotated at a correspondingly high speed at the start of the cast and its rotation is opposed by a force which slows down its rotational speed at approximately the same rate as the velocity of the bait is decreased by the wind resistance. Thus the overrunning of the spool is prevented and there is no tendency for a backlash to occur.

The force referred to is developed by the antibacklash mechanism. The assembly comprising the block 87, the pivoted members 88 and 89, and the brake members 90 and 91, rotates with the reel spool and the pivoted members 88 and 89 are subjected to centrifugal force developed by the rotation. For the most part this force is applied in a radial direction but since the said members 88 and 89 are not pivoted opposite their centers of mass there is also an axial component which tends to rotate the members 88 and 89 on their pivots and press the brake members 90 and 91 against the disc 94. Thus a retarding force is developed by friction which slows down the spool.

The pressure which the brake members exert on the disc 94 depends on the rotational speed and also on the axial position of the disc. The pressure varies with the axial position of the disc for any given rotational speed because of the fact that the axial component of centrifugal force acting on the members 88 and 89 depends on the angular position of these members on their pivots when the brake members 90 and 91 are in engagement with the disc 94. As the parts are shown in Fig. 6, for example, it will be clear that there will be a considerable axial component acting to press the brake members against the disc. It will also be clear that this component will be increased when the disc is adjusted to a position in which it is farther away from the frame plate 12 and that it will be decreased as the disc is adjusted toward the frame plate. When the disc is in its extreme right hand position against the frame plate the axial component is reduced to zero by rotation of members 88 and 89 on their pivots before the brake members 90 and 91 engage the disc. In this position of the disc, therefore, the antibacklash mechanism is "off," that is, it exerts no retarding force acting to oppose rotation of the reel spool.

The amount of braking required to eliminate backlash will depend on the weight and size of the bait, the condition of the wind, and to some extent on the casting technique of the fisherman. The requisite adjustment for satisfactory operation is readily obtained by means of the knob 105, which regulates the position of disc 94 as already explained.

The invention having been described, that which is believed to be new and for which the protection of Letters Patent is desired will be pointed out in the appended claim.

I claim:

In a fishing reel, a frame, a spool rotatably mounted in said frame, click and brake mechanism associated with said spool and mounted on said frame, an end cap secured to said frame, said end cap having a semicircular recess on the outside, a knob rotatably mounted in said recess by a shaft extending through said end cap, the end of said knob being substantially flush with the outer surface of said end cap and the periphery of said knob being substantially flush with the periphery of said end cap, and means comprising two cams mounted on said shaft inside said end cap and operated by said knob for operating said click mechanism and said brake mechanism, respectively.

GORDON F. LAING.

REFERENCES CITED

The following references are of record in the file of this patent:

UNITED STATES PATENTS

| Number | Name | Date |
|---|---|---|
| 364,509 | Gundorph | June 7, 1887 |
| 476,621 | Fenner | June 7, 1892 |
| 703,585 | Vom Hofe | July 1, 1902 |
| 824,438 | Richardson | June 26, 1906 |
| 969,234 | Wollensak | Sept. 6, 1910 |
| 969,235 | Wollensak | Sept. 6, 1910 |
| 1,690,401 | Case | Nov. 6, 1928 |
| 1,948,333 | Case | Feb. 20, 1934 |
| 2,485,741 | King | Oct. 25, 1949 |

FOREIGN PATENTS

| Number | Country | Date |
|---|---|---|
| 795,401 | France | Jan. 6, 1936 |